United States Patent [19]

Chadha

[11] Patent Number: 5,688,438
[45] Date of Patent: Nov. 18, 1997

[54] PREPARATION OF HIGH PURITY SILICATE-CONTAINING PHOSPHORS

[75] Inventor: Surjit S. Chadha, Meridian, Id.

[73] Assignee: Micron Display Technology, Inc., Boise, Id.

[21] Appl. No.: 597,218

[22] Filed: Feb. 6, 1996

[51] Int. Cl.[6] ............................... C09K 11/59
[52] U.S. Cl. ................. 252/301.4 F; 252/301.6 F; 423/326; 250/363.01; 345/76
[58] Field of Search ............ 423/326; 252/301.4 F, 252/301.6 F; 250/363.01; 345/76

[56] References Cited

U.S. PATENT DOCUMENTS

| | | | |
|---|---|---|---|
| 3,984,587 | 10/1976 | Lipp | 252/301.4 F |
| 4,551,397 | 11/1985 | Yaguchi et al. | 428/691 |
| 4,806,822 | 2/1989 | Takahara et al. | 313/467 |
| 4,894,583 | 1/1990 | Berkstresser et al. | 313/468 |
| 5,210,472 | 5/1993 | Casper et al. | 315/349 |
| 5,372,973 | 12/1994 | Doan et al. | 437/228 |
| 5,531,880 | 7/1996 | Xie et al. | 204/478 |

OTHER PUBLICATIONS

Gomes et al., "Preparation and Cathodoluminescence of $Ce^{3+}$-Activated Yttrium Silicates and Some Isostructural Compounds," *Mat. Res. Bull.*, 4, 643–650 (Jul. 1969).

Hess et al., "Photoluminescence of Zinc Silicate Doped with AL and Ti," *Journal of the Electrochemical Society*, 130(12), 2443–2447 (Dec. 1983).

M. Leskha et al., "Effect of Flux Materials on the Reaction of $Y_2O_3$ and $SiO_2$," *J. Am. Ceram. Soc.*, 70(7), C160–C161 (Jul. 1987).

Morozova et al., "Yttrium Silicates –New Bases for Cathodoluminophors," *Bulletin of the Academy of Science of the USSR*, 33(6), pp. 990–992 (Jun. 1969).

*Primary Examiner*—Melissa Bonner
*Attorney, Agent, or Firm*—Mueting, Raasch, Gebhardt & Schwappach, P.A.

[57] ABSTRACT

A method of preparing a silicate-containing phosphor is provided. The method includes combining a mixture of metal or metalloid compounds with a gaseous silicon-containing in an amount sufficient to convert the compounds to silicates, and heating the silicates under conditions effective to form a phosphor.

54 Claims, 1 Drawing Sheet

PREPARATION OF HIGH PURITY SILICATE-CONTAINING PHOSPHORS

The present invention was made with government support from the Advanced Research Projects Agency Contract under Grant No. DABT 63-93-C-0025. The Government has certain rights in this invention.

FIELD OF THE INVENTION

The present invention is directed to display devices, such as field emission display devices, particularly phosphors used in display devices and methods of preparation of these phosphors.

BACKGROUND OF THE INVENTION

Display devices, such as desk-top computer screens and direct view and projection television sets, include electron excited fluorescent display devices such as cathode ray tubes. Cathode ray tubes (CRTs) function as a result of a scanning electron beam from an electron gun impinging on phosphors on a relatively distant glass screen. The phosphors absorb the energy from the electron beam and subsequently emit a portion of the energy, which is typically in the visible region of the electromagnetic spectrum. This visible emission is then transmitted through the glass screen to the viewer. Other display devices, such as field emission displays for use in flat panel display screens, which include cold cathode emission devices, and vacuum fluorescent displays for use in handheld calculators, which include hot cathode emission devices, also function as a result of electrons exciting phosphors on a screen.

Phosphors are inorganic or organic luminescent materials that typically include "activator" atoms that can modify the emitted radiation, such that the emission is in the visible region, as well as modify the emission intensity and the persistence of the image. Phosphors should preferably be capable of maintaining luminescence (e.g., fluorescence) under excitation for a relatively long period of time to provide superior image reproduction. This is particularly important for high resolution CRTs, for example. With a CRT phosphor screen of a short persistence phosphor, flickering can occur on the screen, particularly when the phosphor screen scanning speed is relatively slow. Thus, phosphors have been developed that exhibit a long "after glow period" (i.e., the time required for the emission luminance to decrease to 10% of the emission luminance under excitation after the excitation of the phosphor is stopped), which is also referred to as the "persistence time".

A number of silicate-containing phosphors are known that possess a relatively long persistence time. For example, manganese- and arsenic-activated zinc silicate phosphor (P39 phosphor), manganese-activated zinc silicate phosphor (P 1 phosphor), as well as other zinc silicate phosphors containing manganese as the main activator are green emitting phosphors with long persistence times and large emission intensities. Other silicate-containing phosphors are also of commercial significance, such as yttrium silicates (e.g., cerium-activated yttrium silicate or P47 phosphor), magnesium silicates (e.g., manganese-activated magnesium silicate or P13 phosphor), calcium silicates (e.g., lead- and manganese-activated calcium silicate or P25 phosphor), and the like, because of various desirable properties.

Silicate-containing phosphors are typically prepared using silicic acid ($H_3SiO_3$). For example, $Zn_2SiO_4$:Mn (P1 phosphor) is prepared by the reaction of ZnO, hydrated $SiO_2$ (i.e., $H_3SiO_3$), $MnCO_3$, and other additives. Silicic acid, however, tends to contain impurities, such as sodium, potassium, calcium, etc. For example, highly pure silicic acid suitable for the preparation of phosphors can include as much as 450 ppm sodium, 180 ppm calcium, 50 ppm magnesium, 450 ppm aluminum, and 60 ppm iron. Although these elements can be used in a wide variety of phosphors for certain applications, they are generally undesirable in phosphors used in high resolution displays, such as field emission displays. Typically, this is because mobile ions such as $Na^+$ and $Ca^{2+}$ can degrade the silicon circuits.

Also, in general, it is desirable to produce highly pure phosphors to increase absorption of the available excitation energy by the activator that emits the required radiation, rather than being consumed by other impurities or "killer" centers, which would result in lower luminescence and lower efficiency. In some cases, the presence of impurities may also result in reduced phosphor lifetime. Thus, what is needed is a method of preparing silicate-containing phosphors that are more pure than many conventional silicate-containing phosphors.

SUMMARY OF THE INVENTION

The present invention provides a method for preparing a silicate containing phosphor. This method includes the steps of: providing a mixture of metal or metalloid compounds; providing a gaseous silicon compound selected from the group consisting of a silicon hydride, a silicon halide, and a silicon hydride halide; combining the mixture of metal or metalloid compounds with the gaseous silicon compound in an amount sufficient to convert the compounds to silicates; and heating the silicates under conditions effective to form a phosphor. As used herein, the phrase "mixture of metal or metalloid compounds" includes mixtures of metal compounds, metalloid compounds, or metal compounds and metalloid compounds.

Preferably, the silicon compound is gaseous at room temperature and the metal or metalloid compounds include metals or metalloids that provide a phosphor lattice having a band gap of at least about 2.5 eV. In certain particularly preferred embodiments, the metal or metalloid compounds are salts and the silicon compound is a silane optionally substituted with iodine, chlorine, and bromine.

The method of the present invention can be carded out in solution. For example, the method can involve providing an aqueous solution of the mixture of metal or metalloid salts; and passing the gaseous silicon compound through the aqueous solution to form the silicates. The solution of the mixture of metal or metalloid salts can be prepared by dissolving a mixture of metal or metalloid oxides in an acidic solution. With this solution method, the silicates are collected by precipitating them out of solution prior to the subsequent step of heating, which preferably occurs at a temperature of about 1000°–1500° C.

The method of the present invention can also involve reaction at a solid-vapor interface. That is, the gaseous silicon compound can be passed over a mixture of the metal or metalloid compounds, which are in the solid state. Preferably, the gaseous silicon compound is mixed with a carrier gas and oxygen. Alternatively, the method of the present invention can involve reaction in the gas phase. That is, the method can include a step of volatilizing the mixture of metal or metalloid compounds prior to combining it with the gaseous silicon compound. Prior to the step of volatilizing, this mixture of metal or metalloid compounds can be in the solid state or the compounds can be dissolved in an organic solvent.

The metal or metalloid compounds preferably include metals of Groups IA and IIA, the transition metals, the lanthanides and actinides, the metals and metalloids of Groups IIIA, IVA, and VA, although they more preferably include the transition metals, the lanthanides and actinides, and the metals and metalloids of Groups IIIA, IVA, and VA. For certain applications, the phosphors made by the methods of the present invention include less than about 10 ppm of impurities selected from the group consisting of alkali metals and alkaline earth metals.

Also provided are phosphors preparable by the method of the present invention and display devices, such as field emission display devices, that include these phosphors.

DETAILED DESCRIPTION

Figure 1:
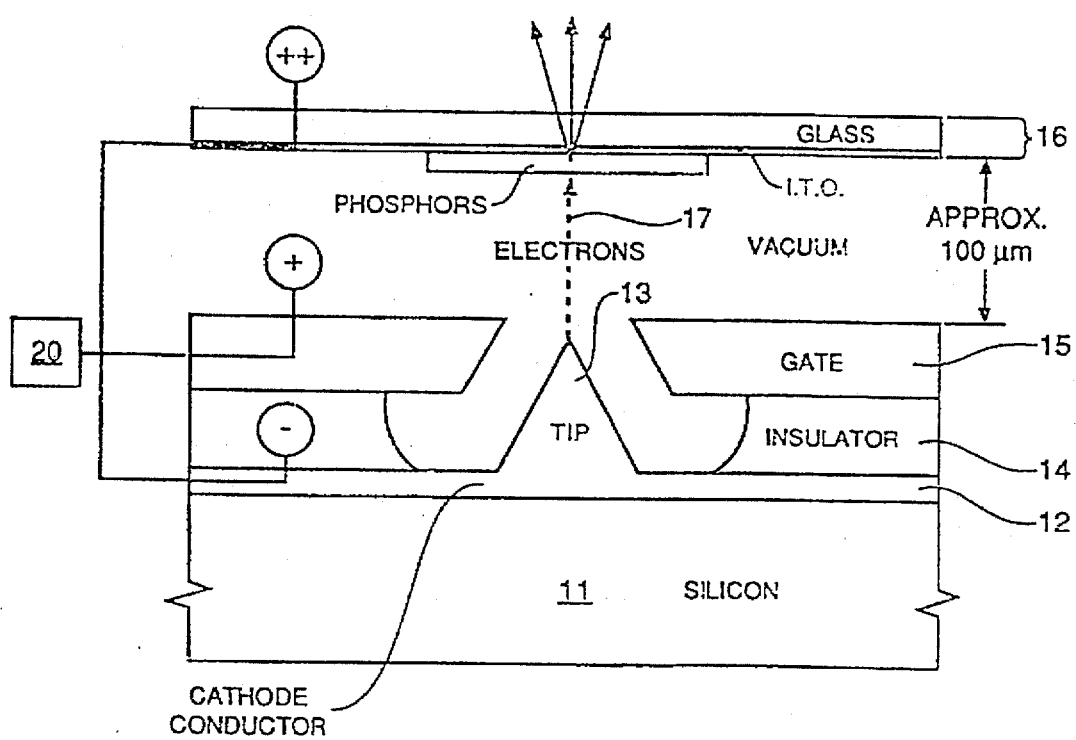
FIG. 1 is a cross-sectional schematic of field emission display device that includes phosphors made by the method of the present invention.

The present invention provides a method for making silicate-containing phosphors that are generally more pure than conventionally synthesized silicate-containing phosphors. That is, the present invention provides a method for making silicate-containing phosphors that typically have fewer undesirable elements than similar phosphors made using silicic acid, for example. Preferably, the method of the present invention provides silicate-containing phosphors having less than about 1 part per million (ppm) each of undesirable impurities. As used herein, an "undesirable impurity" refers to a element, ion, or compound that is not specifically added as a reactant, but is added as a result of its presence as an impurity in one of the reactants (e.g., silicic acid).

Typically, undesirable impurities are the alkali metals and alkaline earth metals, although other elements, such as iron and aluminum, for example, can also be undesirable, if they are not added as a specific reactant to the reaction mixture for the phosphor. Thus, more preferably, the method of the present invention provides silicate-containing phosphors having a total of less than about 10 ppm of impurities selected from the group consisting of alkali metals and alkaline earth metals. It is understood, however, that any of these elements, even the alkali metals and alkaline earth metals, can be purposely added as a specific reactant and, therefore, not be considered an "undesirable impurity". Therefore, the present invention provides a more controllable method of forming silicate-containing phosphors.

This method involves combining a mixture of metal or metalloid compounds (e.g., $Zn(NO_3)_2$ and $Ce(NO_3)_3$) with a gaseous silicon compound, preferably a silicon hydride compound optionally substituted with one or more halide atoms per molecule (e.g., the silanes $SiH_4$ and $Si_2H_6$, and the silicon hydride halides $SiH_3Cl$, $SiH_3Br$, and $SiH_2Cl_2$). This reaction can be carried out in solution, at a solid-vapor phase interface, or in the gas phase. That is, the metal or metalloid salts can be dissolved (partially or completely) in an aqueous solution, for example, and the gaseous silicon compound passed through the solution, either by bubbling or vigorously stirring under an atmosphere of the gas, for example. Alternatively, the solid metal or metalloid salts can be placed in an atmosphere of the gaseous silicon compound. Finally, the metal or metalloid salts, either in the solid state or solution (e.g., acetone solution), can be volatilized, as in a chemical vapor deposition process, and combined with the gaseous silicon compound, in a tube furnace, for example.

Furthermore, the silicon compound can be a solid, liquid, or gas at room temperature and atmospheric pressure, as long as under the conditions of the reaction it is in the gas phase.

If the solution method is used, the silicates are precipitated out of solution and then heated in a firing step to form the phosphor. If either the solid-vapor method or the gas phase method is used, the silicates are prepared in situ and further heated during a firing step to form the phosphor. The firing process used is that typically used in conventional processes for the preparation of phosphors, although lower temperatures (e.g., about 100°–400° C. lower) are possible.

Using either the solution, solid-vapor, or gas phase methods, the silicate structure can be built from ionic species, rather than resulting from the break down of large silicate tetrahedral structures, which occurs in many conventional methods. Thus, the method of the present invention is more efficient. That is, the reactions typically occur faster and at lower temperatures. Thus, the method of the present invention is more energy efficient.

The metal or metalloid compounds include, but are not limited to, nitrates, carbonates, sulfates, oxalates, halides (preferably, chlorides, bromides, and iodides), oxides, sulfides, nitrides, acetates, acetylacetonates ("acac"), or mixtures thereof. Preferably, the metal or metalloid compound is a salt (i.e., the compound formed when the hydrogen of an acid is replaced by a metal or its equivalent). More preferably, the metal or metalloid salt is a water soluble salt, such as a nitrate, for the solution phase method, or an organic soluble salt, such as an acetylacetonate, for the gas phase reaction.

Many of the metal or metalloid compounds are commercially available, and can be used in various combinations. That is, for the preparation of a phosphor containing manganese and zinc, the manganese can be present as a nitrate salt and the zinc as a sulfate salt. Preferably, however, because it is often easier and more economical to produce these salts in situ, they all have the same counterion. For example, oxides of the metals or metalloids can be combined and dissolved in nitric acid to form the nitrates. Typically, the nitric acid is of an appropriate molarity to effectively dissolve all of the oxides. Typically, this occurs using a 2 molar solution, although 1–10 molar solutions can be used, depending on the metal oxide. Other acids, such as hydrochloric acid, for example, can also be used, depending on the compound to be dissolved.

As used herein, the metal or metalloid compounds include metals and metalloids that produce a phosphor lattice having a band gap of at least about 2.5 eV, preferably a band gap within a range of about 2.5–3.8 eV. These typically include the metals of Group IA (i.e., Group 1) and Group IIA (i.e., Group 2) of the Periodic Table, the transition metals (i.e., those elements with their outermost electrons in "d" orbitals), the lanthanides and actinides (i.e., those elements with their outermost electrons in "f" orbitals), the metals and metalloids of Group IIIA (i.e., Group 13, the metals Al, Ca, In, and Tl, and the metalloid B), the metals and metalloids of Group IVA (i.e., Group 14, the metals Sn and Pb, and the metalloids Si and Ge), and the metals and metalloids of Group VA (i.e., Group 15, the metal Bi, and the metalloids As and Sb). Preferably, for display devices such as field emission displays, the metal and metalloid compounds include the transition metals, the lanthanides and actinides, as well as the metals and metalloids of Groups IIIA, IVA, and VA. The alkali metals and alkaline earth metals are not desired for the phosphors used in such display devices generally because they can be detrimental to the silicon circuitry.

Typically, silicate-containing phosphors include zinc, magnesium, manganese, calcium, beryllium, titanium, lead, arsenic, cerium, yttrium, lanthanum, and cadmium. Preferably, the silicate-containing phosphors made by the method of the present invention include zinc, manganese, titanium, lead, arsenic, cerium, yttrium, lanthanum, and cadmium. Examples of silicate-containing phosphors that can be made using the method of the present invention include $Zn_2SiO_4$:Mn (P1), $MgSiO_3$:Mn (P13), $CaMgSiO_4$:Ti (P18), $CaBeSiO_4$:Mn, $CaSiO_3$:Pb,Mn (P25), $Zn_2SiO_4$:Mn,As (P39), $Y_2SiO_5$:Ce (P47), $Zn_2SiO_4$:Ti (P52), and mixtures thereof. Preferably, the silicate-containing phosphors that can be made using the method of the present invention include $Zn_2SiO_4$:Mn (P1), $Zn_{2SiO4}$:Mn,As (P39), $Y_2SiO_5$:Ce (P47), $Zn_2SiO_4$:Ti (P52), and mixtures thereof. As used herein, "silicate-containing phosphors" or simply "silicates" include both silicates and orthosilicates.

The gaseous silicon compound suitable for conversion of the metal or metalloid compounds to silicates are silicon hydrides (i.e., silanes), silicon halides, or silicon hydride halides. Thus, suitable silicon compounds include, but are not limited to, silanes such as $SiH_4$ and $Si_2H_6$, silicon hydride halides such as $SiH_3Cl$, $SiH_3Br$, and $SiH_2Cl_2$, and silicon halides, including mixed halides, such as $SiCl_4$, $SiBr_4$, and $SiFCl_2$. Preferably, the gaseous silicon compound is a silicon hydride optionally substituted with one or more halide atoms per molecule. More preferably, the gaseous silicon compound is a silicon hydride (i.e., silane) optionally substituted with one or more iodine, chlorine, or bromine atoms per molecule. Most preferably, the silicon compound is a silane, of which the most suitable is $SiH_4$. The silicon compound is preferably gaseous under ambient conditions, although it only needs to be gaseous under the conditions of the reaction (e.g., under the conditions of the vapor phase reaction). As used herein, ambient conditions refer to room temperature (i.e., about 20°–25° C.) and atmospheric pressure (i.e., about 1 atmosphere).

The metal or metalloid compounds are typically combined in the appropriate stoichiometric mounts for the desired phosphor, although the silicon compound can be included in an excess amount. If in the form of water soluble salts, the mixture of metal or metalloid compounds can be dissolved (at least partially) in an aqueous solution, or if in the form of oxides, they can be dissolved in an acidic aqueous solution, and an appropriate amount of the gaseous silicon compound passed through the solution to form silicates. This can be done by bubbling the gas through the solution or stirring the solution rapidly under an atmosphere of the gas, for example. A source of oxygen can also be supplied to the reaction mixture, such as a peroxide, to allow for higher yields of the silicates. The silicates typically have low solubility in water and thus tend to fall out of solution, although the reaction mixture may need to be cooled to cause the silicates to precipitate out of solution. The precipitate can then be collected, washed, and dried before subsequent firing.

Alternatively, a mixture of solid metal or metalloid compounds can be placed in a tube furnace, for example, and the gaseous silicon compound combined with a carder gas (e.g., argon, helium, neon, xenon, and nitrogen) and passed over the solid mixture. This may or may not require external heating, depending on how exothermic is the silicate forming reaction. The metal or metalloid compounds can also be subjected to conditions to cause them to volatilize while in the tube furnace, thereby allowing for a gas phase reaction with the gaseous silicon compound. This can be done under standard chemical vapor deposition techniques (e.g., temperatures of about 500°–1000° C. and pressures of about 1–100 millitorr). For example, the metal or metalloid compounds can be in solution (e.g., $Zn(acac)_2$ and $Ce(acac)_2$ in an acetone solution) or the solid state and volatilized by exposing them to reduced pressures, for example. Similarly, the silicon compound can also be in solution or the solid state and volatilized. Whether the reaction occurs at the interface of a solid with a gas, or completely in the gas phase, a source of oxygen can also be supplied to the reaction mixture, such as oxygen gas mixed with the gaseous silicon compound, to allow for higher yields of the silicates. The silicates can then be collected, or they can be exposed to subsequent firing while in the tube furnace.

These methods produce silicate materials having a generally small particle size (i.e., less than about 5 micrometers). Whereas conventional methods typically produce silicates having an average particle size of about 5 micrometers, the solution method of the present invention can produce silicates having an average particle size of no greater than about 2 micrometers. Furthermore, the solid-vapor and gas phase methods can produce submicron particle size silicates. Such fine particle size materials are typically desirable for high resolution displays.

The silicates formed by the method of the present invention can subsequently be fired by conventional methods. The firing can be conducted from one to a few times (e.g., 3–4 times). Typically, this is done in air or other oxidizing atmosphere, although an inert or reducing atmosphere can be used. Firing conditions for conventional methods of forming the silicates include temperatures of about 1300°–1400° C. at atmospheric pressure (i.e., about 1 atmosphere). The silicates formed by the method of the present invention can be fired at a temperature of about 1000°–1500° C., and preferably at a temperature of about 1200°–1300° C., at least in part because of their finer particle size. The firing time may be varied depending on the types of silicates, the firing temperature, and the method used in producing the silicates. That is, if the silicates are formed in a tube furnace with externally applied heat, for example, they may be somewhat prefired. Thus, a shorter firing time can be used. Typically, however, firing times are on the order of about 0.5–6 hours.

The phosphors produced by the method of the present invention can be used alone or in combination. They can also be used with other phosphors made by conventional methods. Furthermore, they can be deposited by a variety of standard techniques, such as precipitation coating, spin coating, PVA-AD slurry, electrophoresis, brushing, and electrostatic coating. Although they are particularly suitable for use in computer display devices, particularly field emission displays, they can be used in a variety of other applications and electron excited fluorescent display devices, such as a standard CRT used in television sets. They can also be used in virtual reality screens, book video screens, head-mounted display devices, and the like.

The highly pure silicate-containing phosphors made by the method of the present invention are particularly useful in field emission displays. Field emission displays typically include a display panel having a transparent gas-tight envelope, and two main planar electrodes arranged within the gas-tight envelope parallel with each other. One of the two main electrodes is a cold cathode with a grid, and the other is an anode. The anode may consist of a transparent glass plate, a transparent electrode formed on the transparent glass plate, and a phosphor layer coated on the transparent electrode. Devices such as this are further disclosed in U.S. Pat. Nos. 5,210,472 and 5,372,973, for example.

A field emission display employing a cold cathode is shown in FIG. 1, for example. Referring to this figure, substrate 11 can be made of glass, for example, or a variety of other suitable materials. Preferably, a single crystal silicon layer serves as substrate 11 onto which a conductive material layer 12, such as doped polycrystalline silicon, has been deposited. At a field emission site location, a conical micro-cathode 13 has been constructed on top of substrate 11. Surrounding the micro-cathode 13, is a low potential anode gate structure 15. When a voltage differential, through source 20, is applied between the cathode 13 and the gate 15, a stream of electrons 17 is emitted toward a phosphor coated screen 16. Screen 16 is an anode and includes phosphors made by the method of the present invention. The electron emission tip 13 is integral with the single crystal semiconductor substrate 11, and serves as a cathode conductor. Gate 15 serves as a low potential anode or grid structure for its respective cathode 13. A dielectric insulating layer 14 is deposited on the conductive cathode layer 12, and has an opening at the field emission site location.

The invention will be further described by reference to the following detailed example. This example is offered to further illustrate the various specific and illustrative embodiments and techniques. It should be understood, however, that many variations and modifications may be made while remaining within the scope of the present invention.

EXPERIMENTAL EXAMPLE

Preparation of $Y_2SiO_5$:Ce $Y_2O_3$ and $Ce_2O_3$ are mixed in the desired amounts and dissolved in 2M nitric acid to form nitrates. When cooled, a 30% aqueous solution of $H_2O_2$ is added to the mixture. The requisite amount of silane gas is bubbled through this mixture with vigorous stirring to convert the nitrates to silicates. The reaction mixture is then cooled using external means, such as an ice bath to precipitate the silicates. The precipitated silicates are filtered and washed with copious quantities of deionized water. The filtrate is dried at 125° C. for 12 hours. The dried filtrate is then fired under conventional conditions.

The complete disclosure of all patents, patent documents, and publications cited herein are incorporated by reference. The foregoing detailed description and example have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for preparing a silicate-containing phosphor comprising:
   (a) providing a mixture of oxygen-containing metal or metalloid compounds;
   (b) providing a gaseous silicon compound selected from the group consisting of a silicon hydride, a silicon halide, and a silicon hydride halide;
   (c) combining the mixture of metal or metalloid compounds with the gaseous silicon compound in an mount sufficient to convert the compounds to silicates; and
   (d) heating the silicates under conditions effective to form a phosphor.

2. The method of claim 1 wherein the metal or metalloid compounds are metal or metalloid salts.

3. The method of claim 2 wherein the step of combining comprises:
   (a) providing an aqueous solution of the mixture of metal or metalloid salts; and
   (b) passing the gaseous silicon compound through the aqueous solution to form the silicates.

4. The method of claim 3 wherein the aqueous solution of the mixture of metal or metalloid salts is prepared by dissolving a mixture of metal or metalloid oxides in an acidic aqueous solution.

5. The method of claim 3 wherein the step of combining further comprises a step of collecting the silicates by precipitating them out of solution prior to the step of heating the silicates.

6. The method of claim 1 wherein the conditions effective to form a phosphor include heating the mixture of silicates at a temperature of about 1000°–1500° C.

7. The method of claim 1 wherein the step of combining comprises passing the gaseous silicon compound over a mixture of the metal or metalloid compounds in the solid state.

8. The method of claim 7 wherein the gaseous silicon compound is mixed with a carrier gas and oxygen.

9. The method of claim 1 further including a step of volatilizing the mixture of metal or metalloid compounds prior to the step of combining.

10. The method of claim 9 wherein the mixture of metal or metalloid compounds is in the solid state prior to being volatilized.

11. The method of claim 9 wherein the mixture of metal or metalloid compounds is dissolved in an organic solvent prior to being volatilized.

12. The method of claim 1 wherein the silicon compound is a silicon halide or a Silicon hydride halide containing iodine, chlorine, or bromine.

13. The method of claim 12 wherein the silicon compound is gaseous at room temperature.

14. The method of claim 1 wherein the metal or metalloid compounds are compounds that include metals or metalloids capable of producing a phosphor lattice having a band gap of at least about 2.5 eV.

15. The method of claim 14 wherein the metals or metalloids include metals of Groups IA and IIA, the transition metals, the lanthanides and actinides, the metals and metalloids of Groups IIIA, IVA, and VA.

16. The method of claim 15 wherein the metals or metalloids include the transition metals, the lanthanides and actinides, and the metals and metalloids of Groups IIIA, IVA, and VA.

17. The method of claim 16 wherein the phosphor includes less than about 10 ppm of impurities selected from the group consisting of alkali metals and alkaline earth metals.

18. A phosphor prepared by a method comprising:
   (a) providing a mixture of oxygen-containing metal or metalloid compounds;
   (b) providing a gaseous silicon compound selected from the group consisting of a silicon hydride, a silicon halide, and a silicon hydride halide;
   (c) combining the mixture of metal or metalloid compounds with the gaseous silicon compound in an amount sufficient to convert me compounds to silicates; and
   (d) heating the silicates under conditions effective to form the phosphor.

19. A display device comprising a phosphor prepared by a method comprising:
   (a) providing a mixture of oxygen-containing metal or metalloid compounds;
   (b) providing a gaseous silicon compound selected from the group consisting of a silicon hydride, a silicon halide, and a silicon hydride halide;

(c) combining the mixture of metal or metalloid compounds with the gaseous silicon compound in an amount sufficient to convert the compounds to silicates; and (d) heating the silicates under conditions effective to form the phosphor.

20. The display device of claim 19 which is a field emission display device.

21. The phosphor of claim 18 wherein the phosphor contains less than about 1 part per million each of impurities selected from the group consisting of alkali metals and alkaline earth metals.

22. The phosphor of claim 18 wherein the phosphor contains less than about 10 parts per million of impurities selected from the group consisting of alkali metals and alkaline earth metals.

23. The display device of claim 19 wherein the phosphor contains less than about 1 part per million each of impurities selected from the group consisting of alkali metals and alkaline earth metals.

24. The display device of claim 19 wherein the phosphor contains less than about 10 parts per million of impurities selected from the group consisting of alkali metals and alkaline earth metals.

25. A method for preparing a silicate-containing phosphor comprising:

(a) providing a gaseous silicon compound selected from the group consisting of a silicon hydride, a silicon halide, and a silicon hydride halide;

(b) providing an aqueous solution of a mixture of metal or metalloid salts;

(c) passing the gaseous silicon compound through the aqueous solution to form silicates; and (d) heating the silicates under conditions effective to form a phosphor.

26. The method of claim 25 wherein the aqueous solution of the mixture of metal or metalloid salts is prepared by dissolving a mixture of metal or metalloid oxides in an acidic aqueous solution.

27. The method of claim 25 wherein the step of passing the gaseous silicon compound through the aqueous solution further comprises a step of removing the silicates from the solution prior to the step of heating the silicates.

28. A method for preparing a silicate-containing phosphor comprising:

(a) providing a mixture of metal or metalloid compounds in the solid state;

(b) providing a gaseous silicon compound selected from the group consisting of a silicon hydride, a silicon halide, and a silicon hydride halide;

(c) passing the gaseous silicon compound over the mixture of metal or metalloid compounds in an amount sufficient to convert the compounds to silicates; and (d) heating the silicates under conditions effective to form a phosphor.

29. The method of claim 25 wherein the conditions effective to form a phosphor include heating the mixture of silicates at a temperature of about 1000°–1500° C.

30. The method of claim 25 wherein the gaseous silicon compound is mixed with a carrier gas and oxygen.

31. The method of claim 25 wherein the gaseous silicon compound is a silane optionally substituted with iodine, chlorine, or bromine.

32. The method of claim 25 wherein the phosphor includes less than about 10 ppm of impurities selected from the group consisting of alkali metals and alkaline earth metals.

33. The method of claim 25 wherein the metal or metalloid salts include metals or metalloids that produce a phosphor lattice having a band gap of at least about 2.5 eV.

34. The method of claim 25 wherein the metal or metalloid salts are selected from the group consisting of a nitrate, a carbonate, a sulfate, an oxalate, a halide, an acetate, and mixtures thereof.

35. The method of claim 28 wherein the conditions effective to form a phosphor include heating the mixture of silicates at a temperature of about 1000°–1500° C.

36. The method of claim 28 wherein the gaseous silicon compound is mixed with a carrier gas and oxygen.

37. The method of claim 28 wherein the gaseous silicon compound is a silane optionally substituted with iodine, chlorine, or bromine.

38. The method of claim 28 wherein the phosphor includes less than about 10 ppm of impurities selected from the group consisting of alkali metals and alkaline earth metals.

39. The method of claim 28 wherein the metal or metalloid compounds include metals or metalloids that produce a phosphor lattice having a band gap of at least about 2.5 eV.

40. The method of claim 28 wherein the metal or metalloid compounds are selected from the group consisting of a nitrate, a carbonate, a sulfate, an oxalate, a halide, an oxide, a sulfide, a nitride, an acetate, an acetylacetonate, and mixtures thereof.

41. A method for preparing a silicate-containing phosphor comprising:

(a) providing a gaseous silicon compound selected from the group consisting of a silicon hydride, a silicon halide, and a silicon hydride halide;

(b) providing an aqueous solution of a mixture of metal or metalloid salts which include metals of Groups IA and IIA, the transition metals, the lanthanides and actinides, and metals and metalloids of Groups IIIA, IVA, and VA;

(c) passing the gaseous silicon compound through the aqueous solution to form silicates;

(d) precipitating the silicates out of solution; and (e) heating the silicates at a temperature of about 1000°–1500° C. to form a phosphor.

42. The method of claim 41 wherein the silicate-containing phosphor is selected from the group consisting of $Zn_2SiO_4$:Mn, $MgSiO_3$:Mn, $CaMgSiO_4$:Ti, $CaBeSiO_4$:Mn, $CaSiO_3$:Pb,Mn, $Zn_2SiO_4$:Mn,As, $Y_2SiO_5$:Ce, $Zn_2SiO_4$:Ti, and mixtures thereof.

43. A method for preparing a silicate-containing phosphor comprising:

(a) providing a mixture of metal or metalloid compounds in the solid state which include metals of Groups IA and IIA, the transition metals, the lanthanides and actinides, and metals and metalloids of Groups IIIA, IVA, and VA;

(b) providing a gaseous silicon compound selected from the group consisting of a silicon hydride, a silicon halide, and a silicon hydride halide;

(c) passing the gaseous silicon compound over the mixture of metal or metalloid compounds in an amount sufficient to convert the compounds to silicates; and (d) heating the silicates at a temperature of about 1000°–1500° C. to form a phosphor.

44. The method of claim 43 wherein the silicate-containing phosphor is selected from the group consisting of $Zn_2SiO_4$:Mn, $MgSiO_3$:Mn, $CaMgSiO_4$:Ti, $CaBeSiO_4$:Mn, $CaSiO_3$:Pb,Mn, $Zn_2SiO_4$:Mn,As, $Y_2SiO_5$:Ce, $Zn_2SiO_4$:Ti, and mixtures thereof.

45. A phosphor prepared by a method comprising:
  (a) providing a gaseous silicon compound selected from the group consisting of a silicon hydride, a silicon halide, and a silicon hydride halide;
  (b) providing an aqueous solution of a mixture of metal or metalloid salts;
  (c) passing the gaseous silicon compound through the aqueous solution to form silicates; and
  (d) heating the silicates under conditions effective to form a phosphor.

46. (New) The phosphor of claim 45 which is selected from the group consisting of $Zn_2SiO_4$:Mn, $MgSiO_3$:Mn, $CaMgSiO_4$:Ti, $CaBeSiO_4$:Mn, $CaSiO_3$:Pb,Mn, $Zn_2SiO_4$:Mn,As, $Y_2SiO_5$:Ce, $Zn_2SiO_4$:Ti, and mixtures thereof.

47. A display device comprising a phosphor prepared by a method comprising:
  (a) providing a gaseous silicon compound selected from the group consisting of a silicon hydride, a silicon halide, and a silicon hydride halide;
  (b) providing an aqueous solution of a mixture of metal or metalloid salts;
  (c) passing the gaseous silicon compound through the aqueous solution to form silicates; and
  (d) heating the silicates under conditions effective to form a phosphor.

48. The display device of claim 47 which is a field emission display device.

49. A phosphor prepared by a method comprising:
  (a) providing a mixture of metal or metalloid compounds in the solid state;
  (b) providing a gaseous silicon compound selected from the group consisting of a silicon hydride, a silicon halide, and a silicon hydride halide;
  (c) passing the gaseous silicon compound over the mixture of metal or metalloid compounds in an amount sufficient to convert the compounds to silicates; and
  (d) heating the silicates under conditions effective to form a phosphor.

50. The phosphor of claim 49 which is selected from the group consisting of $Zn_2SiO_4$:Mn, $MgSiO_3$:Mn, $CaMgSiO_4$:Ti, $CaBeSiO_4$:Mn, $CaSiO_3$:Pb,Mn, $Zn_2SiO_4$:Mn,As, $Y_2SiO_5$:Ce, $Zn_2SiO_4$:Ti, and mixtures thereof.

51. A display device comprising a phosphor prepared by a method comprising:
  (a) providing a mixture of metal or metalloid compounds in the solid state;
  (b) providing a gaseous silicon compound selected from the group consisting of a silicon hydride, a silicon halide, and a silicon hydride halide;
  (c) passing the gaseous silicon compound over the mixture of metal or metalloid compounds in an amount sufficient to convert the compounds to silicates; and
  (d) heating the silicates under conditions effective to form a phosphor.

52. The display device of claim 51 which is a field emission display device.

53. A method for preparing a silicate-containing phosphor comprising:
  (a) providing a mixture of oxygen containing metal or metalloid salts which include metals of Groups IA and IIA, the transition metals, the lanthanides and actinides, and metals and metalloids of Groups IIIA, IVA, and VA;
  (b) providing a gaseous silicon compound selected from the group consisting of a silicon hydride, a silicon halide, and a silicon hydride halide;
  (c) combining the mixture of metal or metalloid salts with the gaseous silicon compound in an amount sufficient to convert the compounds to silicates; and
  (d) heating the silicates at a temperature of about 1000°–1500° C. to form a phosphor.

54. The method of claim 53 wherein the silicate-containing phosphor is selected from the group consisting of $Zn_2SiO_4$:Mn, $MgSiO_3$:Mn, $CaMgSiO_4$:Ti, $CaBeSiO_4$:Mn, $CaSiO_3$:Pb,Mn, $Zn_2SiO_4$:Mn,As, $Y_2SiO_5$:Ce, $Zn_2SiO_4$:Ti, and mixtures thereof.

* * * * *

UNITED STATES PATENT AND TRADEMARK OFFICE
CERTIFICATE OF CORRECTION

PATENT NO.: 5,688,438
DATED: November 18, 1997
INVENTOR(S): Surjit S. Chadha

It is certified that error appears in the above-identified patent and that said Letters Patent is hereby corrected as shown below:

Col. 7, line 58, delete "an mount" and insert --an amount--;

Col. 8, line 29, delete "Silicon" and insert --silicon--;

Col. 8, line 57, delete "convert me" and insert --convert the--; and

Col. 9, line 2, delete "an mount" and insert --an amount--.

Signed and Sealed this

Twenty-fourth Day of November, 1998

Attest:

BRUCE LEHMAN

Attesting Officer

Commissioner of Patents and Trademarks